United States Patent
Zirwas et al.

(10) Patent No.: US 8,780,753 B2
(45) Date of Patent: Jul. 15, 2014

(54) RESOLVING CHANNEL STATE INFORMATION OUTDATING

(75) Inventors: Wolfgang Zirwas, München (DE); Lars Thiele, Berlin (DE); Volker Jungnickel, Berlin (DE)

(73) Assignee: Nokia Siemens and Networks Oy, Espoo (FI)

( * ) Notice: Subject to any disclaimer, the term of this patent is extended or adjusted under 35 U.S.C. 154(b) by 113 days.

(21) Appl. No.: 13/505,871

(22) PCT Filed: Nov. 4, 2009

(86) PCT No.: PCT/EP2009/064615
§ 371 (c)(1),
(2), (4) Date: Jun. 11, 2012

(87) PCT Pub. No.: WO2011/054381
PCT Pub. Date: May 12, 2011

(65) Prior Publication Data
US 2012/0250557 A1   Oct. 4, 2012

(51) Int. Cl.
*H04J 3/14*       (2006.01)
*H04L 12/26*      (2006.01)
*H04W 4/00*       (2009.01)
*H04W 72/12*      (2009.01)

(52) U.S. Cl.
CPC ...... *H04W 72/1231* (2013.01); *H04W 72/1284* (2013.01)
USPC ............................ 370/252; 370/329; 370/431

(58) Field of Classification Search
None
See application file for complete search history.

(56) References Cited

U.S. PATENT DOCUMENTS

| 2007/0099577 | A1 | 5/2007 | Lee et al. ......................... 455/69 |
| 2007/0254602 | A1* | 11/2007 | Li et al. ............................ 455/88 |
| 2008/0075007 | A1 | 3/2008 | Mehta et al. ................... 370/238 |
| 2009/0221238 | A1* | 9/2009 | Ko et al. ..................... 455/67.13 |
| 2011/0268007 | A1* | 11/2011 | Barany et al. ................. 370/312 |

FOREIGN PATENT DOCUMENTS

| WO | WO 2007/130943 A1 | 11/2007 |
| WO | WO 2008/003022 A2 | 1/2008 |

OTHER PUBLICATIONS

3GPP TS 36.300 V8.0.0 (Mar. 2007), "3rd Generation Partnership Project; Technical Specification Group Radio Access Network; Evolved Universal Terrestrial Radio Access Network (E-UTRAN); Overall description; Stage 2 (Release 8)", 82 pgs.
R1-093038, 3GPP TSG RAN WG1 Meeting #58, Shenzhen, P.R. China, Aug. 24-28, 2009, "Downlink CoMP JP Evaluation and Feedback Design", Huawei, 5 pgs.

* cited by examiner

Primary Examiner — Ashley Shivers
(74) Attorney, Agent, or Firm — Harrington & Smith

(57) ABSTRACT

It is described a method of operating a base station and a base station which uses a communication channel depending on channel state related information and time information e.g. a prediction time. In this way, problems due to outdating of the channel state related information may be overcome and a feedback overhead may be reduced. According to other embodiments, other parameters like a used prediction method, a prediction horizon, etc. are used to provide a better scenario adaption. Other embodiments relate to combined long term prediction and short term prediction and respective timing settings. Other embodiments relate to a method of operating a user equipment and a user equipment which is adapted for communicating the required time information between the base station and the user equipment.

12 Claims, 4 Drawing Sheets

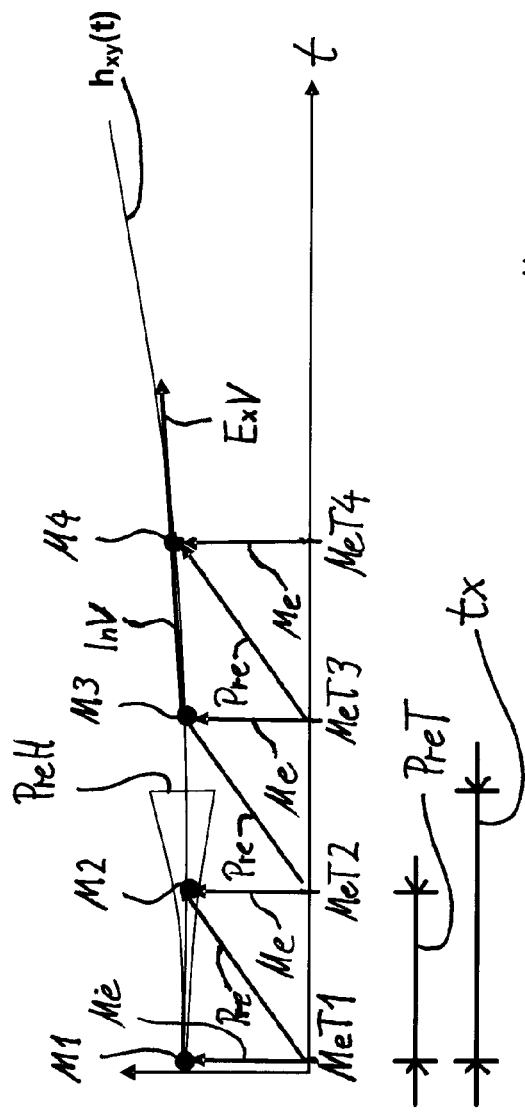
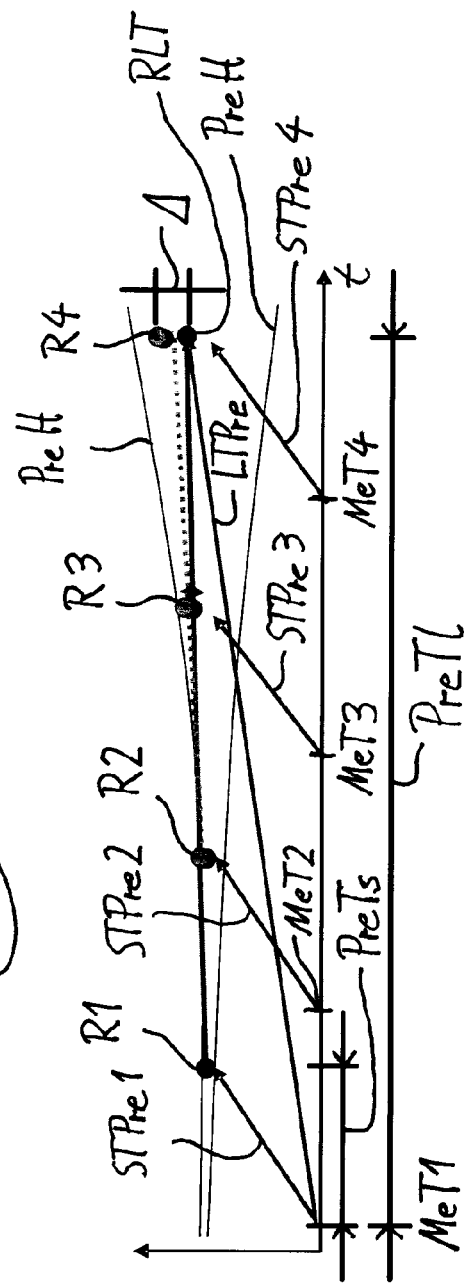
Fig. 4
Fig. 5

RESOLVING CHANNEL STATE INFORMATION OUTDATING

FIELD OF INVENTION

The present invention relates to the field of wireless communication networks and in particular to cooperative wireless communication networks.

ART BACKGROUND

For advanced wireless communication networks, channel state information is of increasing importance. For example, in LTE Advanced ($3^{rd}$ Generation Partnership Project Long Term Evolution Advanced), a so called coordinated multi point transmission (CoMP) has been proposed. Herein, data to be transmitted to a particular user equipment (UE) are precoded, referred to as joint precoding, and transmitted over at least two base stations (BS) so as to generate constructive interference at the particular UE, thereby improving data transmission. Usually, precoded data are transmitted from several eNBs simultaneously to several UEs. Ideally every frequency may be used in each cell while achieving the same capacity as in a network without interferences.

For effective joint precoding, channel information is of high importance. For example, cell specific reference signals may be transmitted from the base stations to the UE, allowing the UE to estimate the downlink channels from the surrounding base stations. However, distributing channel state information is resource demanding.

In view of the above-described situation, there exists a need for an improved technique that enables to provide a communication network with improved characteristics, while substantially avoiding or at least reducing one or more of the above-identified problems.

SUMMARY OF THE INVENTION

This need may be met by the subject matter according to the independent claims. Advantageous embodiments of the herein disclosed subject matter are described by the dependent claims.

According to a first aspect of the herein disclosed subject matter there is provided a method of operating a base station of a communication network. The method comprises receiving channel state related information from a user equipment (UE) of the communication network, wherein the channel state related information being based on a measurement performed by the UE. In accordance with the first aspect, a communication channel between the base station and the UE is used depending on the channel state related information and a time information which is associated with a measurement time at which the measurement has been performed by the UE.

This aspect is based on the idea that the characteristics, e.g. the data transfer rates, of a communication network may be improved when taking into account time information which is associated with a measurement performed by a UE. In this way, according to embodiments, outdated channel state related information may be identified. Hence, an adverse combination of differently or wrongly delayed channel state information may be avoided. Further, in the case of a coordinated multi point transmission (CoMP), the time information (outdating information) may allow a base station to determine which communication channel is advantageously included for joint precoding in CoMP.

Generally herein, time information refers to any time related information which is associated with a measurement time of a measurement at the UE. Such time information may include time information related to timings in the UE, information related to timings in the base station, information related to timings in the core network, etc. Time information may also cover timing-settings as well as delays that are measured or estimated by communication network components such as the base station or the UE. Further, according to other embodiments, the time information refers to information which is indirectly related to timings, e.g. a prediction method, an estimated prediction error, etc.

According to an embodiment, the time information indicates the time of measurement. According to another embodiment, the time information indicates a time interval for which the channel state information is considered to be valid, e.g. by the BS, by the UE, by a standard, etc. According to a further embodiment, the time information is indicating an outdating time after which the channel state related information is considered (e.g. by the aforementioned mentioned "entities") to be not reliable.

Generally, the time information may be fixedly set, e.g. fixedly stored in the base station. For example, the time information may even be standardized. According to other embodiments, the time information may be determined by the base station or by the UE, e.g. depending on operating conditions. According to other, mixed embodiments, the time information may be determined partially by the base station and partially by the UE. In an example of such a mixed embodiment, the base station is configured for setting the measurement time, i.e. the time at which a measurement is to be performed by the UE, while on the other hand the UE is configured for setting a prediction time interval, during which a prediction of channel state information is possible within a certain error range. Instead of setting a parameter, the parameter may be fixedly prestored in the UE.

According to an embodiment, channel state related information is any feedback information which is related to the channel state of the communication channel between the BS and the UE. According to an embodiment, the channel state related information is not related to a particular channel. For example, in model based feedback schemes it is possible to measure only the geographical location of the UE and feed back only the geographical location of the UE to the BS, thereby allowing the BS to determine the channel state information on the basis of a model describing the surrounding of the BS and the UE. According to an embodiment, a location of the UE is determined on the basis of local surrounding data (model data) describing a surrounding of the UE or the surrounding of the signal path between the UE and the BS and a measurement of a signal propagation delay. According to a further embodiment, the location of the UE is measured by means of a global positioning system (GPS). According to an embodiment, the location of the UE is a three dimensional location. According to another embodiment, the location of the UE is two dimensional location. For example, if it is assumed that the UE has a typical, predetermined height, e.g. 1.5 meter (m), a two-dimensional location specification is sufficient.

According to other embodiments, the channel state related information is related to a particular channel. For instance, the channel state may be measured by the UE on the basis of cell specific reference signals received by the UE from the BS. Further, according to another embodiment, the channel state related information is the result of a prediction of the channel state, the prediction itself being based on the measurement, e.g. measurement of the geographical UE location, measurement of reference signals, etc. However, it should be noted that the above mentioned examples are only exemplary. For instance, according to other embodiments, the geographical location of the UE may be fed back among other channel state related information.

Herein, the term "communication" covers all kinds of communication, e.g. signalling, voice communication, data communication, etc.

According to an embodiment, the communication channel is a wireless communication channel, e.g. a communication channel of a cellular communication network. However, according to other embodiments, other channel types, such as a wired communication channel, are also possible.

Examples of a user equipment are a mobile phone, a cellular phone, a mobile computer, a personal digital assistant (PDA), etc.

According to an embodiment, the base station is a base station comprising features of a base according to a known standard. According to a further embodiment, the base station is a base station of a cellular communication network, e.g. an enhanced nodeB (eNB), e.g. of an LTE communication network (following e.g. 3GPP TS 36.300 V8.0.0 (2007-03)). According to a further embodiment, the term base station as defined herein includes a base transceiver station and, optionally, at least part of a base station controller and/or other network elements to perform the herein defined functions. According to a further embodiment, the base station controller is a radio network controller (RNC).

According to an embodiment the base station and the UE are part of a cooperative antenna system (COOPA). In this case, feeding back the location of the UE results in an even higher efficiency due to the higher number of radio channels for which the channel state information must be estimated.

According to a further embodiment of the first aspect, the time information indicates a predetermined time interval and the communication channel is used at point of time different from said measurement time only if the point of time is within said predetermined time interval from the measurement time.

According to a further embodiment of the first aspect, taking into account the channel state related information comprises predicting a channel state information value for said point of time by taking into account the channel state related information. According to an embodiment, predicting a channel state information value is an interpolation based on measured or predicted values. According to an embodiment, predicting a channel state information value is an extrapolation based on measured or predicted values. Generally, a channel state information value is a matrix, e.g. a so called channel matrix.

According to a further embodiment of the first aspect, said channel state related information is a prediction provided by the UE on the basis of the measurement.

According to a still further embodiment of the first aspect, the method further comprises receiving from the UE a prediction horizon indicating the accuracy of the channel state related information at a certain time after the measurement. According to an embodiment of the first aspect, the method further comprises setting said time information depending on said prediction horizon. In this way, the base station may set a time information optimally adjusted to the prediction capability of and the prediction accuracy provided by the UE. According to an embodiment, the method according to the first aspect comprises transmitting at least part of the time information to the UE. For example, the base station may request from the UE channel state related information for a desired point of time.

According to a further embodiment, receiving channel state related information comprises receiving a long term prediction of channel state information and, subsequently, receiving a short prediction of channel state information. Herein, the long term prediction is valid from a first point of time for a first time interval and said short term prediction is valid from a second point of time for a second time interval.

According to an embodiment, the time information includes said first point of time, said second point of time, said first time interval and said second time interval. According to a further embodiment, the first time interval extends from the first point of time beyond the second point of time. In this way, a self containment may be achieved, wherein the long term prediction provides channel state related information even when the short term prediction fails. Hence, such a configuration is advantageous even if the long term prediction is less accurate than the short term prediction. According to other embodiments, the first time interval extends from the first point of time over an interval covering at least two times the second time interval.

According to a further embodiment, the method according to the first aspect further comprises receiving from the UE operating parameters of the UE and at least partly setting the time information depending on operating parameters of the UE. Embodiments of this type may allow for adapting the time information to actual operating parameters of the UE. User equipment operating parameters may be for example prediction capability information indicating the capability of the UE for providing the channel state related information by prediction, UE speed, etc.

According to a further embodiment, the time information is at least partly fixedly defined. For example, the base station may comprise a storage having stored therein the fixedly defined time information. Fixedly defining the time information allows for an easy implementation of embodiments of the herein disclosed subject matter.

According to a second aspect of the herein disclosed subject matter, a method of operating a UE of a communication network is provided, the method comprising (a) receiving time information from a base station of the communication network, (b) determining, depending on said time information, channel state related information on the basis of a measurement of the UE, and (c) transmitting said channel state related information to the base station.

Any feature of the method according to the second aspect may be configured in accordance with the above mentioned aspects, embodiments and examples of the herein disclosed subject matter. For example, according to an embodiment, the UE is a UE of a cellular communication network.

According to a third aspect of the herein disclosed subject matter, a base station of a communication network is provided, the base station comprising (a) a receiver for receiving channel state related information from a UE of the communication network, the channel state related information being based on a measurement performed by the UE, and (b) a controller for using a communication channel between the base station and the UE depending on the channel state related information and a time information which is associated with a measurement time at which the measurement has been performed.

The controller may e.g. use a threshold or a multi-level quantization of channel related information and the time information for deciding whether or to what extent a communication channel is used.

Any feature of the base station according to the third aspect may be configured in accordance with the above mentioned aspects, embodiments and examples of the herein disclosed subject matter.

According to a fourth aspect of the herein disclosed subject matter, a user equipment of a communication network is provided, the user equipment comprising (a) a receiving unit for receiving time information from a base station of the communication network, (b) a controller for determining, depending on said time information, channel state related information on the basis of a measurement taken by the user equipment, and (c) a transmitting unit for transmitting said channel state related information to the base station.

Any feature of the UE according to the fourth aspect may be configured in accordance with the above mentioned aspects, embodiments and examples of the herein disclosed subject matter.

According to a fifth aspect of the herein disclosed subject matter, a cooperative communication network is provided, the cooperative communication network comprising at least two base stations according to the third aspect or an embodiment thereof, wherein each base station has an interface for exchanging said channel state related information or a quantity derived herefrom among the at least two base stations.

According to an embodiment of the fifth aspect, the cooperative communication network comprises a joint precoding unit having an input for receiving data to be transmitted to one of the at least two UEs, and an out for providing precoded transmit signals to said base stations, wherein said base stations each have an input for receiving a respective one of said precoded transmit signals and a transmitter for transmitting the respective one of said precoded transmit signals to said one of said at least two UEs.

According to an embodiment, the joint precoding unit is located remote from the base stations. According to another embodiment, the joint precoding unit is located in one of the base stations. According to a further embodiment, the joint precoding unit is distributed over two or more base stations.

According to a sixth aspect of the herein disclosed subject matter, a computer program for processing a physical object, namely said time information is provided, the computer program, when being executed by a data processor, is adapted for controlling the method according to the first aspect or an embodiment thereof.

According to a seventh aspect of the herein disclosed subject matter, a computer program for processing a physical object, namely said time information is provided, the computer program, when being executed by a data processor, is adapted for controlling the method according to the second aspect or an embodiment thereof.

As used herein, reference to a computer program is intended to be equivalent to a reference to a program element and/or a computer readable medium containing instructions for controlling a computer system to coordinate the performance of one of the above described methods.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the following there will be described exemplary embodiments of the subject matter disclosed herein with reference to a method for operating a base station and a method for operating a UE. It has to be pointed out that of course any combination of features relating to different aspects of the herein disclosed subject matter is also possible. In particular, some embodiments have been described with reference to apparatus type claims whereas other embodiments have been described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims, is considered to be disclosed with this application. Further for any feature disclosed with regard to a method of operating a base station or with regard to a base station a corresponding feature of a method of operating a UE or a corresponding feature of the UE itself is considered to be disclosed with this application. For example, when having regard to the explicitly disclosed feature that the method according to the first aspect comprises "receiving from the UE operating parameters of the UE", the corresponding feature that a method of operating a UE may comprise "transmitting operating parameters of the UE to the base station" is considered to be disclosed.

The aspects and embodiments defined above and further aspects and embodiments of the present, herein disclosed subject matter are apparent from the examples to be described hereinafter and are explained with reference to the drawings, but to which the herein disclosed subject matter is not limited.

BRIEF DESCRIPTION OF THE DRAWINGS

FIG. 4 schematically illustrates parameters of embodiments of the herein disclosed subject matter.

FIG. 5 schematically illustrates further parameters of embodiments of the herein disclosed subject matter.

DETAILED DESCRIPTION

Figure 1:
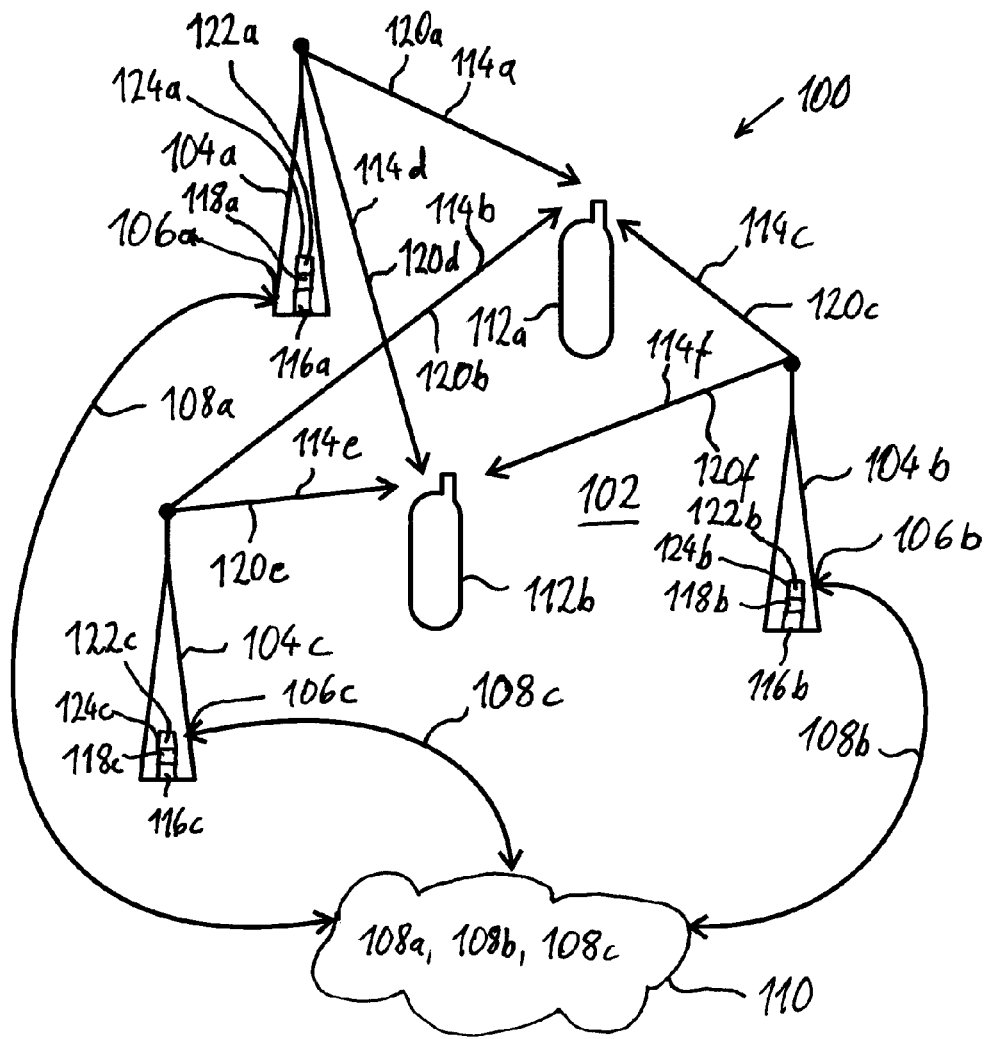
FIG. 1 shows a communication network in accordance with embodiments of the herein disclosed subject matter.

The illustration in the drawings is schematic. It is noted that in different figures, similar or identical elements are provided with the same reference signs or with reference signs, which are different from the corresponding reference signs only within the first digit or in an appended character.

For high end CoMP or single user (SU) multiple input multiple output (MIMO) schemes as well as multi user (MU) MIMO schemes, accurate channel state information (CSI) is a prerequisite for good performance. Specifically for CoMP mutual interference, free transmission to several UEs from several spatially dislocated eNBs leads to a high sensitivity to CSI errors. This leads to several challenges:

Amount of CSI overhead is quite significant and requires powerful feedback compression schemes Even in case of low mobility CSI outdating—i.e. the difference between the reported CSI for the time of measurement t1 to the evolved radio channel at time t2, where the precoded data are eventually transmitted simultaneously from the cooperating base stations— will limit achievable performance significantly. While CSI outdating is a general issue for any closed loop precoding scheme, in case of CoMP joint precoding (JP) there might be additional delay over the backbone network connecting adjacent cooperating base stations (e.g an X2 interface) at different sites, easily adding several ms of delay to the feedback and precoding links. Overall and taking processing times at the UEs and the base stations into account, 5 ms delay on the feedback loop can be regarded as very good but one easily might end up with 10 ms or even more.

One challenge is therefore to find a robust as well as high end solution to overcome CSI outdating, for example for LTE Advanced schemes like CoMP or SU-/MU-MIMO.

In addition, any further feedback reduction of commonly available schemes would be advantageous.

Many known feedback reduction schemes like subspace approaches, tracking solutions exist which try to reduce the feedback overhead to manageable levels. Some of these known schemes rely to quite some extend on the assumption that UE mobility is restricted to few kmhs, making it possible to exploit correlation in time domain.

Further analysis of the inventors has revealed that the low mobility assumption mentioned above allows for simple prediction techniques like linear prediction with good results.

Further, it has been proposed to use channel prediction based on model based channel estimation. This proposal has the potential to greatly reduce overall CSI feedback overhead.

In cooperative communication networks, highest performance would be achieved in case of a full network wide cooperation, but this would require channel estimation from all base stations (e.g. eNBs in the case of LTE Advanced) to all UEs, feedback of this huge amount of information from the UEs to the base stations (according to an embodiment, FDD systems are assumed) as well as multicasting of user data from all UEs to all base stations.

In practical systems therefore so called cooperation areas (CA) may be defined, limiting cooperation to a few adjacent cells.

Joint precoding requires full knowledge of all relevant radio channels within the CA from all cooperating eNBs to all UEs. In FDD systems this can be done only by some form of reporting of the estimated radio channels from the UEs to the eNBs with sufficient accuracy. Assuming sizes of CA of 3-5 or even 8 cells in combination with 1 to 2 relevant antenna ports per cell one UE has to report channel state information for up to 16 radio channels. In order to increase performance, these radio channels have to be known with high frequency selectivity, e.g. per physical resource block (PRB) or even per half PRB.

High after CoMP signal to interference noise ratios (SINRs) of up to 20 dB should be ideally supported for most powerful joint precoding solutions. This really requires accurate CSI feedback from UEs to eNBs with accordingly high feedback overhead. Due to the high after CoMP SINR target, CSI outdating is another very important issue—even for low mobility which issue is solved by embodiments of the herein disclosed subject matter.

FIG. 1 shows part of an exemplary example of a cooperative communication network 100 in accordance with embodiments of the herein disclosed subject matter. The communication network comprises a cooperation area 102, defined by three base stations 104a, 104b, 104c, each of which being in accordance with embodiments of the herein disclosed subject matter. Each base station 104a, 104b, 104c has an interface 106a, 106b, 106c for exchanging channel state related information 108a, 108b, 108c or a quantity derived herefrom among the at least two base stations 104a, 104b, 104c. In FIG. 1, the cloud 110 represents the multicasting of the channel state related information 108a, 108b, 108c among the base stations 104a, 104b, 104c. In another embodiment, the reference signs 108a, 108b, 108c in FIG. 1 represent respective precoding matrices derived from the channel state information. The channel state related information is based on a measurement performed by the UE according to embodiments of the herein disclosed subject matter, e.g. on a channel state measurement or on a location measurement. According to an embodiment, the channel state related information 108a, 108b, 108c or the quantity derived therefrom may be exchanged among the base stations 104a, 104b, 104c via an X2-interface.

FIG. 1 further shows two user equipments, a first user equipment 112a and a second user equipment 112b, both located in the cooperation area 102. The base stations 104a, 104b, 104c transmit coordinated multi point transmissions 114a, 114b, 114c to the first user equipment 112a and coordinated multi point transmissions 114d, 114e, 114f to the second user equipment 112b.

By having the coordinated multi point transmissions respectively precoded, these transmissions constructively interfere at the respective user equipment, thereby increasing the possible data throughput for this user equipment.

Each base station 104a, 104b, 104c comprises a receiver 116a, 116b, 116c for receiving channel state related information from the user equipments 112a, 112b. Further, each base station 104a, 104b, 104c comprises a controller 118a, 118b, 118c for using a communication channel 120a, 120b, 120c, 120d, 120e, 120f between the base station and the respective user equipment 112a, 112b depending on the channel state related information and a time information which is associated with a measurement time at which the measurement has been performed. The time information, indicated at 122a, 122b, 122c in FIG. 1, is stored in a respective storage 124a, 124b, 124c. According to an embodiment, the time information is a fixedly stored, i.e. not changeable, time interval for which a channel state related information received from a user equipment is valid.

Embodiments of the herein disclosed subject matter deal with some practical issues for implementing linear CSI prediction for LTE Advanced and propose a more elaborated scheme to leverage further reductions of CSI feedback. However, one object of embodiments is to overcoming problems due to outdating of channel state related information such as CSI measurements, CSI prediction, model based CSI related parameters, etc.

Figure 2:
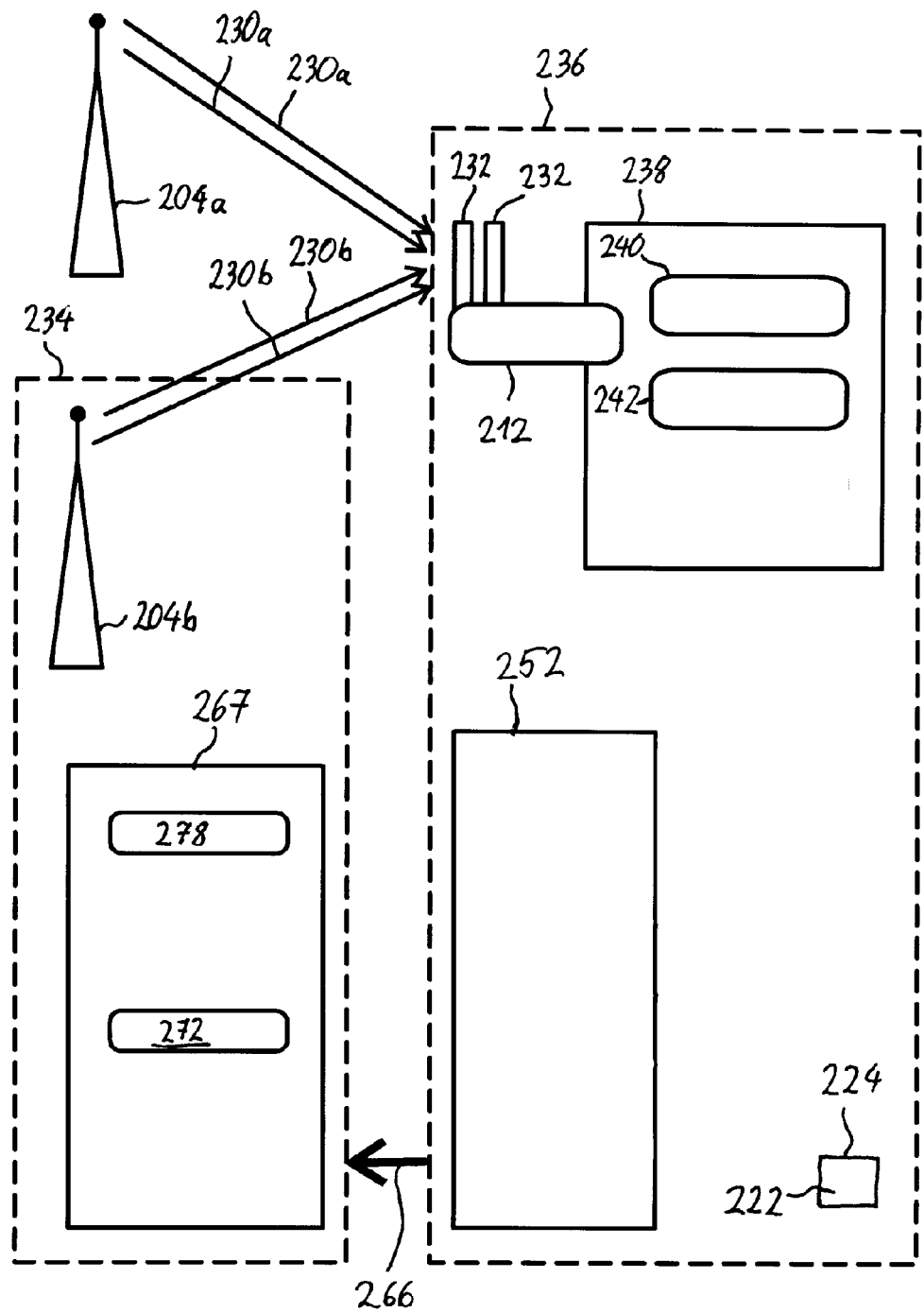
FIG. 2 shows a further communication network in accordance with embodiments of the herein disclosed subject matter.

FIG. 2 shows part of a communication network 200 in accordance with embodiments of the herein disclosed subject matter. Further, FIG. 2 illustrates an according overall feedback concept according to embodiments of the herein disclosed subject matter, where beside channel interpolation, tracking and ZIP compression, CSI prediction is an integral part of it. It should be noted that according to embodiments, some or all function blocks are leading to limited processing effort or are a reuse of already implemented functions, like CSI interpolation based on reference signals.

In detail, the system 200 of FIG. 2 comprises two base stations 204a, 204b which transmit reference signal 230a, 230b to a user equipment 212. The user equipment 212 comprises multiple antennas 232, e.g. two antennas as shown in FIG. 2, for forming a UE beamformer.

In FIG. 2, the function blocks associated with the base station 204b are indicated at 234 and the function blocks associated with the user equipment are indicated at 236.

A subband selection unit 238 of FIG. 2 comprises a CSI estimation/interpolation block 240, where a CSI is measured (estimated) from the respective reference signals 230a, 230b and interpolated, if necessary.

Thereafter, a CSI prediction for a time interval of 5 ms is performed in a prediction block 242 of the subband selection unit. The time information 222 including the time interval of 5 ms is stored in a storage 224 of the UE.

In response to the CSI prediction, a feedback message 266 is generated in a processing unit 252. The feedback message 266 is subsequently transmitted back to the respective base station, i.e. to the base station 204b in the case of FIG. 2. In an exemplary embodiment, the feedback message requires a feedback of only 2 times 200 bit per frame (corresponding to two tracking reports per frame).

In the base station, the feedback message 266 processed in a control unit 267. In an interpolation block 272, a channel state information (CSI) is generated for a desired point of time by an interpolation which is based on the feedback message 266.

After determining which sub carriers are suitable for transmission, finally, in scheduling block 278, the part of the multipoint transmission of base station 204b is scheduled for a user equipment 212.

Figure 3:
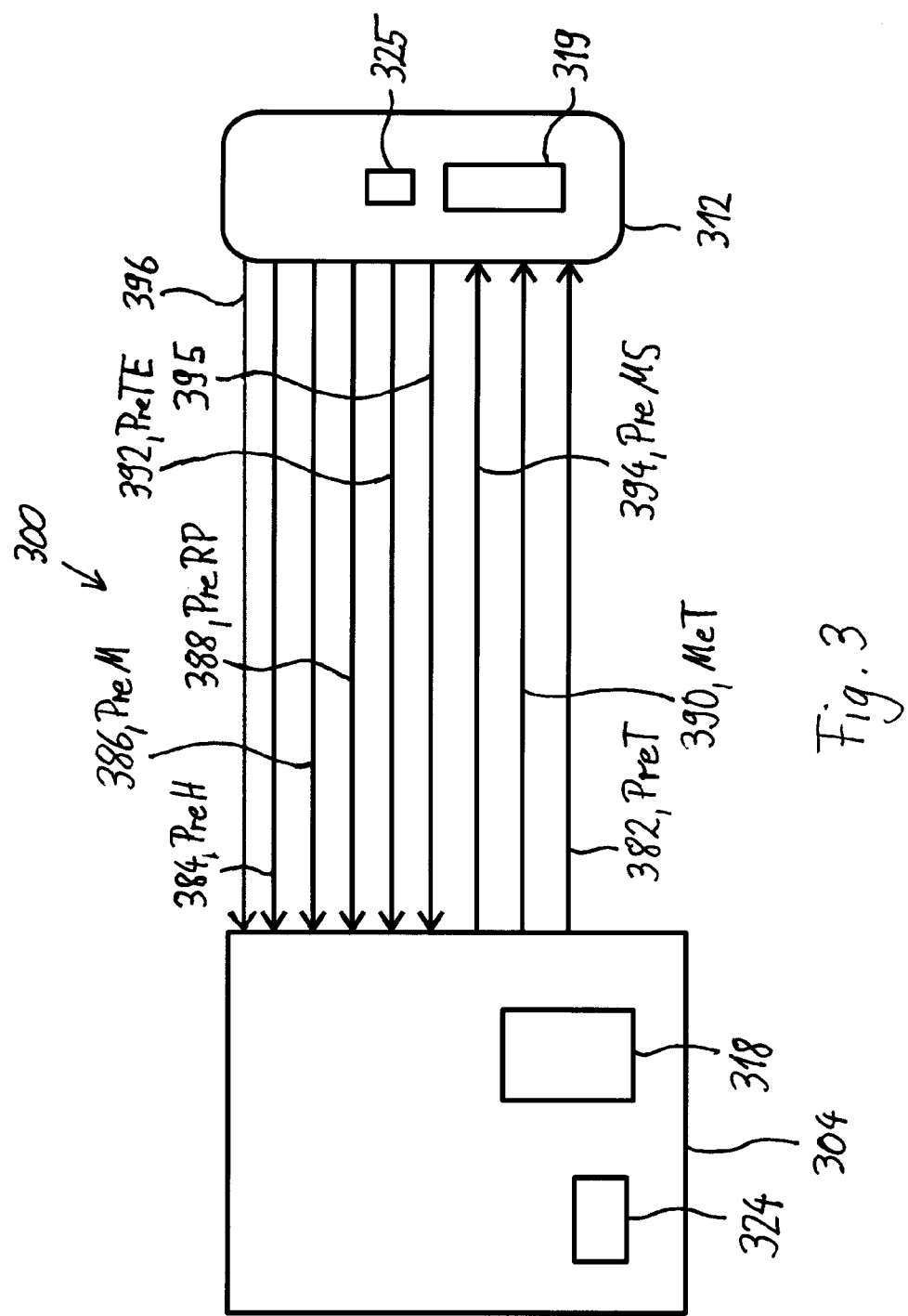
FIG. 3 shows a further communication network in accordance with embodiments of the herein disclosed subject matter.

FIG. 3 shows exemplarily, as a part of a communication network 300, a base station 304 and a user equipment 312. Practical realization of CSI prediction techniques with good performance requires that the UE as well as the eNB knows the correct prediction time PreT. In case it's a default value, like e.g. 5 milliseconds (ms) as described with regard to FIG. 2, this relative timing value of 5 ms may be standardized and stored in a storage 324, 325 of the base station 304 and the UE 312, respectively. In addition the UE and eNB have to know the time for which the CSI measurements have been done at the UE, e.g. every n-th and m-th subframe of the frame.

Such time information may be also stored unchangeable in the storage 325 of the UE 312, according to an embodiment. According to other embodiments, shown in FIG. 3, the points of time at which the CSI measurements have to be performed by the UE 312 (measurement timing MeT), e.g. each n-th and m-th subframe of a frame, may be specified by the base station 304 in a respective default measurement timing message 390.

In case that different UEs with either different capabilities or different mobile speed cooperate, the time interval within which, with regard to the time of measurement, prediction is possible might be different for different UEs. Furthermore UEs might have different prediction techniques (linear, non linear, model based) implemented allowing for different prediction horizons, given a certain prediction accuracy target. To deal in an improved way with such situations, according to an embodiment, the UE 312 is configured for providing to the base station at least one operation parameter, e.g. UE speed, prediction capability of the UE, prediction horizon of the UE, etc.

Further, according to another embodiment, one criterion for setting the time information is the "after CoMP SINR target", i.e the signal to interference target after cooperation, for the UEs. Cell edge UEs might have a much larger prediction horizon due to the envisaged low after CoMP SINR, allowing for larger prediction errors compared to cell center UEs demanding highest prediction accuracy.

As a result following control messages may be implemented for organizing optimum CSI prediction:

In a UE specific prediction timing message 382, a prediction timing PreT, e.g., according to an embodiment, relative to the default measurement timing MeT, may be set by the base station 304. According to an embodiment, the prediction timing is set in response to the operating parameters received from the UE 312. The UE specific prediction timings PreT might be related to reporting times within the frame, which are, according to a further embodiment, set by the base station 304 as well (e.g. two reports per frame). Further, all values probably may be semistatically defined by the base station 304 based on UE reports (UE proposals or wishes). In case processing timing or uplink transmission opportunities might lead to ambiguities regarding the measurement timing MeT with respect to a currently received report, according to an embodiment frame counters are added to the measurement timing message 390 to thereby indicate to the UE for which frame the UE should perform a measurement. It should be understood that instead of a frame counter any other identifier for identifying the target on which the measurement is to be performed could be added to the measurement timing message 390.

According to a further embodiment, the UE 312 includes a control unit 319 for calculating the prediction horizon PreH of the UE 312 based on at least one of (a) an after CoMP SINR (partly depending on its Rx processing and partly on the cooperation area interference conditions), (b) a prediction technique applied in the UE (linear, non linear model based), (c) a modulation and coding scheme (MCS), (d) a mobile speed, etc. The UE 312 should inform the base station, e.g. over a physical uplink control channel (PUCCH) in a prediction horizon message 384 about its current mean prediction horizon PreH, so that the base station 304 can organize the regular CSI reporting optimally (by sending respective control messages to the UE 312).

According to other embodiments, for a more advanced prediction technique like model based or non-linear prediction, further control messages implemented in respective embodiments: a) a prediction method message 386 to inform the base station 304 about a prediction method PreM, which the UE uses and b) a reporting parameter message 388 to define the meaning of the reporting values PreRP, like direct CSI values or e.g. location & moving vectors in case of model based feedback. According to an embodiment, some of the above mentioned or other settings might be left as reserved, but not yet implemented values in the control message format in a first implementation.

Hence, possible implementations of channel prediction in accordance with the herein disclosed subject matter are:

a) First Implementation

In case UEs are set into cooperation (or according MIMO) mode they will report CSI values for a per default defined prediction time PreT (e.g. 5 ms) and based on measurements at MeT (e.g. every xth subframe), which is than known (e.g. unchangeably stored) for the UEs as well as the base stations.

The base station knows MeT as well as PreT and can therefore interpolate or extrapolate the predicted CSI values to other transmission times, based on the already correctly received CSI reports.

b) Second implementation (adaptive)

More flexibility can be achieved in case the base station is allowed to change at least the prediction time PreT or even measurement time MeT and prediction time PreT—maybe, according to other embodiments within some limits, semi statically by according messages, e.g. PDCCH messages.

The base station might set PreT in the prediction timing message 382 and MeT in a measurement timing message 390 purely based on system needs.

More powerful will be a scheme where the UEs support the base station by informing the base station about their individual current prediction horizons PreH, which corresponds essentially the UE proposal for the best fitting PreT.

c) Third Implementation (Advanced)

An even more advanced concept is, where UEs are allowed to implement different CSI prediction techniques or methods, like no prediction/linear/non linear or model based prediction. In that case a prediction technique message 392 is used to inform the base station about the UE capabilities PreTE, i.e. about the prediction techniques, the UE is capable of performing. In response the base station can send a PDCCH message setting each UE in a selected prediction mode PreMS by a prediction select message 394. The prediction technique might even change the meaning of the CSI reports. According to an embodiment, this changed meaning is also stored in the storage 324 of the base station 304.

The base station 304 further comprises a controller 318 for deciding whether or to what extent a communication channel between the base station 304 and the user equipment 312 is used. To this end, the controller 318 may e.g. employ a threshold or a multi-level quantization for channel related information as well as a threshold or a multi-level quantization for the available time information, e.g. the time information stored in the storage 324 and/or the time information received from the UE 312.

It should be noted that the above mentioned implementations are only exemplary and for illustrative purposes. In other implementations include some of the above mentioned messages/parameters in a different combination. Other embodiments include all above mentioned messages/parameters. Further, other messages may be implemented base on the above mentioned parameters. For example, according to an embodiment the prediction time PreT is not set by the base station 304 or statically stored therein, but are rather only reported in report messages 395. Accordingly, according to another embodiment, the measurement time MeT is not set by the base station 304 or statically stored therein, but are rather only reported in report messages 396.

FIG. 4 illustrates the time evolution of the value of a channel matrix element $h_{xy}(t)$ as a function of time t and definitions of the prediction horizon PreH, the measurement time MeT and the prediction time PreT with interpolation Inv and extrapolation ExV of CSI prediction Pre at the base station for intermediate transmission times.

Each vertical arrow in FIG. 4 indicates a measurement Me at a measurement time MeT1, MeT2, MeT3 of a corresponding a measured value M1, M2, M3, M4 of the channel matrix element $h_{xy}(t)$ by the user equipment. Each slanted arrow indicates a prediction Pre of the channel matrix element $h_{xy}(t)$ by the user equipment for a prediction time PreT, measured from the respective measurement time. Further indicated in FIG. 4 is the prediction horizon PreH which is a measure for the accuracy of the channel state related information at a certain time tx after the measurement time MeT1. Further indicated in FIG. 4 are estimated interpolation values InV for channel matrix element $h_{xy}(t)$ which are obtained by interpolation between two adjacent measured values, e.g. values M3, M4, or between two predicted values. Further indicated in FIG. 4 are estimated extrapolation values ExV for channel matrix element $h_{xy}(t)$ which are obtained by interpolation on the basis of a measured or predicted value for $h_{xy}(t)$.

In the following, a further advanced prediction scheme is proposed which may provide a combination of large prediction times with an accurate CSI information at the base station. The basic idea of this prediction scheme is illustrated in FIG. 5.

The scheme starts with a very long term prediction time PreT1 of e.g. 20 ms ahead from the current measurement time MeT1, providing a respective long term prediction LTPre up to MeT1+PreT1. Prediction inaccuracy increases over time as illustrated by the funneled prediction horizon PreH in FIG. 5. As a result, the real CSI values R1, R2, R3, R4 of the channel component $h_{xy}(t)$ lie more and more apart from the estimated CSI value RLT the long term prediction LTPre, as is indicated at Δ in FIG. 5 exemplarily for the real CSI value R4. To overcome the inaccuracy it is proposed to add a second more often short term delta prediction report, e.g. every 5 ms, corresponding to respective short term (delta) predictions STPre1, STPre2, STPre3, STPre4 which are based on measurements of the UE at times MeT1, MeT2, MeT3, MeT4.

The delta prediction reports the difference between the long term and the short term prediction under the assumption that the short term prediction is much more accurate. Due to shorter prediction time, the prediction is usually more accurate. Long term prediction alone could be too inaccurate in some applications. When the long term prediction was correct or nearly correct then the delta reports will be very small, which allows to reduce overall reporting overhead with at the same time accurate prediction.

In addition it is assumed that the difference between long term prediction as well as short term prediction is smaller than in case of tracking for an unpredicted radio channel. For that reason the number of bits required for the short term delta reports might be low. For example in case of a perfect long term prediction all delta prediction reports will be zeros, i.e. 'no change' reports.

Accordingly, for implementation of the proposed scheme, there is defined a short term prediction time interval PreTs and a long term prediction time interval PreT1 in accordance with herein disclosed embodiment, e.g. by per default standardized values or by corresponding PDCCH messages. There might be more messages in case short and long term prediction have different reporting size, which according to an embodiment is controlled as well.

According to an embodiment the short and long term prediction scheme of FIG. 5 is further improved by adapting the long term prediction each time new short term CSI information is received. In other embodiments, the determined long term prediction is maintained (i.e. not updated) between long term predictions. However, even in such a case the long term prediction may serve as a fallback position if a short term prediction fails.

According to embodiments of the herein disclosed subject matter, any component of the base station or the user equipment, e.g. the control units are provided in the form of respective computer program products which enable a processor to provide the functionality of the respective elements as disclosed herein. According to other embodiments, any such component may be provided in hardware. According to other—mixed—embodiments, some components may be provided in software while other components are provided in hardware.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present herein disclosed subject matter one can state:

Embodiments of the herein disclosed subject matter relate to a method of operating a base station and a base station which uses a communication channel depending on channel state related information and time information, e.g. a prediction time PreT. In this way, problems due to outdating of the channel state related information may be overcome and the feedback overhead may be reduced. According to other embodiments, other parameters like a used prediction method PreM, a prediction horizon, etc are used to provide a better scenario adaption. Other embodiments relate to combined long term prediction and short term prediction and respective timing settings. Other embodiments relate to a method of operating a user equipment and a user equipment which is adapted for communicating the required time information between the base station and the user equipment.

LIST OF REFERENCE SIGNS 100 communication network
102 cooperation area
104a, 104b, 104c base station
106a, 106b, 106c interface
108a, 108b, 108c channel state related information
110 multicasting
112a, 112b user equipment
114a-f multi point transmission
116a, 116b, 116c receiver
118a, 118b, 118c controller
120a-f communication channel
122a, 122b, 122c time information
124a, 124b, 124c storage
200 communication network
204a, 204b base station
212 user equipment
222 time information
224 storage
230a, 230b reference signal
232 antenna
234 function blocks of base station 204a
236 function blocks of user equipment 212
238 subband selection unit
240 CSI estimation/interpolation block
242 prediction block
252 processing unit
266 feedback message
267 control unit
272 interpolation block
278 scheduling block
300 communication network
304 base station
312 user equipment
318 control unit of 304
319 control unit of 312
324 storage of 304
325 storage of 312
382 prediction timing message
384 prediction horizon message
386 prediction method message
388 reporting parameter message
390 measurement timing message
392 prediction technique message
394 prediction select message
395 actual prediction time report message
396 actual measurement time report message
CSI channel state information
ExV extrapolation values
InV interpolation values
LTPre long term prediction
M1, M2, M3, M4 measured value of channel matrix element
MeT, MeT1, MeT2, MeT3 measurement time
PDCCH Physical downlink control channel
PreT, PreT1, PreT2 prediction time
PreH prediction horizon
PreM prediction method used by UE
PreMS selected prediction method
PreRP indicates meaning of reporting values
PreTE available prediction techniques at UE
R1, R2, R3, R4 real CSI values
RLT estimated CSI value obtained by long term prediction
STPre1, STPre2, STPre3, STPre4 short term prediction
tx time associate with prediction horizon

The invention claimed is:

1. A method comprising:
receiving, at a base station, channel state related information from a user equipment of a communication network, the channel state related information being based on a measurement performed by the user equipment, the channel state related information being a prediction time provided by the user equipment on the basis of the measurement;
using a communication channel between the base station and the user equipment depending on the received channel state related information and a time information which is associated with a measurement time at which the measurement has been performed, the time information comprising a prediction horizon indicating the accuracy of the channel state related information at a specified time after the measurement; and
receiving from the user equipment a message specifying a current mean prediction horizon of the user equipment and organizing the regular channel state information reporting based on the received message.

2. The method of claim 1, wherein:
said time information indicates a predetermined time interval; and
the communication channel is used at a later point of time different from said measurement time only if the later point of time is within said predetermined time interval from the measurement time.

3. The method of claim 1, wherein taking into account the channel state related information comprises predicting a channel state information value for a point of time by taking into account the channel state related information.

4. The method of claim wherein
receiving channel state related information comprises receiving a long term prediction of channel state information and, subsequently, receiving a short term prediction of channel state information;
wherein said long term prediction is valid from a first point of time for a first time interval and said short term prediction is valid from a second point of time for a second time interval; and wherein said first time interval extends from the first point of time beyond the second point of time.

5. The method of claim 1, wherein:
the time information is at least partly fixedly defined.

6. The method of claim 1, further comprising:
receiving from the user equipment operating parameters of the user equipment; and
at least partly setting the time information depending on operating parameters of the user equipment.

7. A method comprising:
receiving time information from a base station of a communication network, the time information comprising a prediction horizon indicating the accuracy of the channel state related information at a specified time after the measurement;
determining, depending on said time information, channel state related information on the basis of a measurement of the user equipment, the channel state information being a prediction time provided by the user equipment on the basis of the measurement; and
transmitting said channel state related information to the base station, wherein transmitting said determined channel state information comprises transmitting a message relating to a current mean state prediction horizon of the user equipment to the base station.

8. An apparatus comprising:
at least one processor;
memory storing a program of instructions;
wherein the memory storing the program of instructions is configured to, with the at least one processor, cause the apparatus to at least:
receive, at a base station, channel state related information from a user equipment of the communication network, the channel state related information being based on a measurement performed by the user equipment, the channel state related information being a prediction time provided by the user equipment on the basis of the measurement;
use a communication channel between the base station and the user equipment depending on the received channel state related information and a time information which is associated with a measurement time at which the measurement has been performed, the time information comprising a prediction horizon indicating the accuracy of the channel state related information at a specified time after the measurement; and
receive from the user equipment a message relating to a current mean prediction horizon of the user equipment and, based on the received message organize the regular channel state information reporting.

9. An apparatus according to claim 8, wherein the apparatus is a base station and further comprising:
an interface for exchanging said channel state related information, or a quantity derived therefrom, with at least one similarly configured base station.

10. The apparatus of claim 8, wherein:
said time information indicates a predetermined time interval; and
the communication channel is used at a later point of time different from said measurement time only if the later point of time is within said predetermined time interval from the measurement time.

11. The apparatus of claim 8, wherein
taking into account the channel state related information comprises predicting a channel state information value for a point of time by taking into account the channel state related information.

12. An apparatus comprising:
at least one processor;
memory storing a program of instructions;
wherein the memory storing the program of instructions is configured to, with the at least one processor, cause the apparatus to at least:
receive time information from a base station of the communication network, the time information comprising a prediction horizon indicating the accuracy of the channel state related information at a specified time after the measurement;
determine, depending on said time information, channel state related information on the basis of a measurement taken by the user equipment, the channel state related information being a prediction time provided by the user equipment on the basis of the measurement; and
transmit said channel state related information to the base station, wherein transmitting said channel state related information comprises transmitting a message relating to a current mean prediction horizon of the user equipment to the base station.

* * * * *

UNITED STATES PATENT AND TRADEMARK OFFICE
CERTIFICATE OF CORRECTION

PATENT NO.        : 8,780,753 B2
APPLICATION NO.   : 13/505871
DATED             : July 15, 2014
INVENTOR(S)       : Wolfgang Zirwas, Lars Thiele and Volker Jungnickel Page 1 of 1

It is certified that error appears in the above-identified patent and that said Letters Patent is hereby corrected as shown below:

On the Title Page, Item (73):
"Assignee: Nokia Siemens and Networks Oy" should be deleted and --Assignee: Nokia Solutions and Networks Oy-- should be inserted.

In the Claims:
In Claim 4:
Column 14, line 59, "claim" should be deleted and --claim 1-- should be inserted.

Signed and Sealed this
Eighteenth Day of November, 2014

Michelle K. Lee
*Deputy Director of the United States Patent and Trademark Office*